United States Patent Office 3,527,040
Patented Sept. 8, 1970

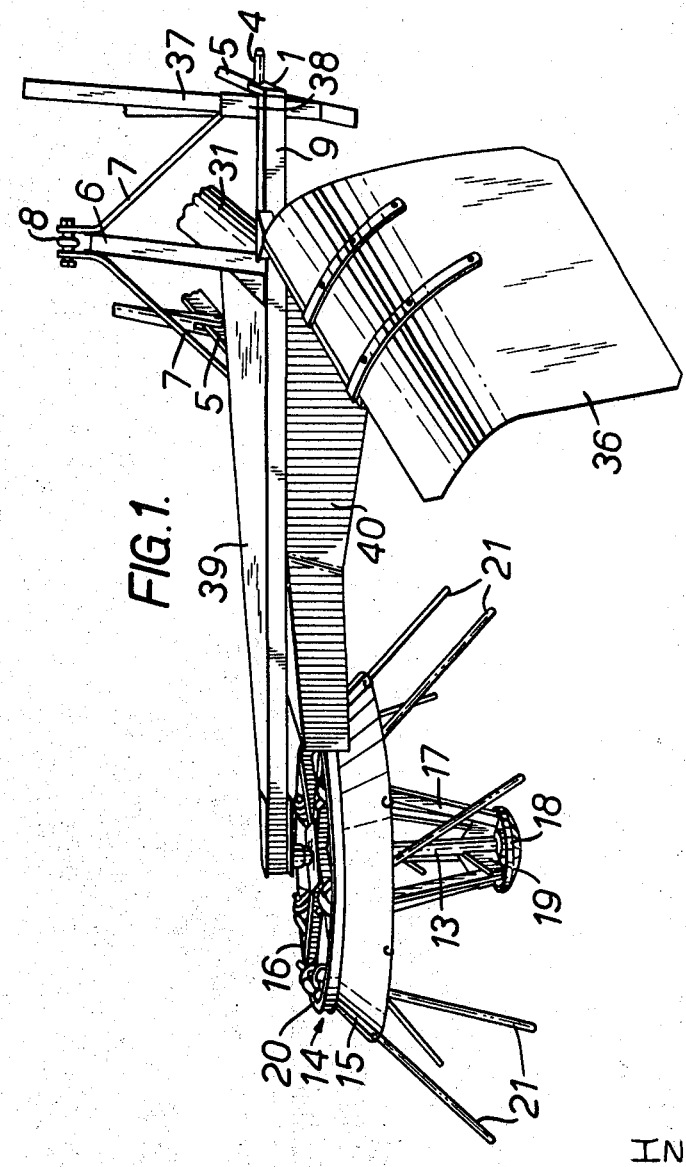

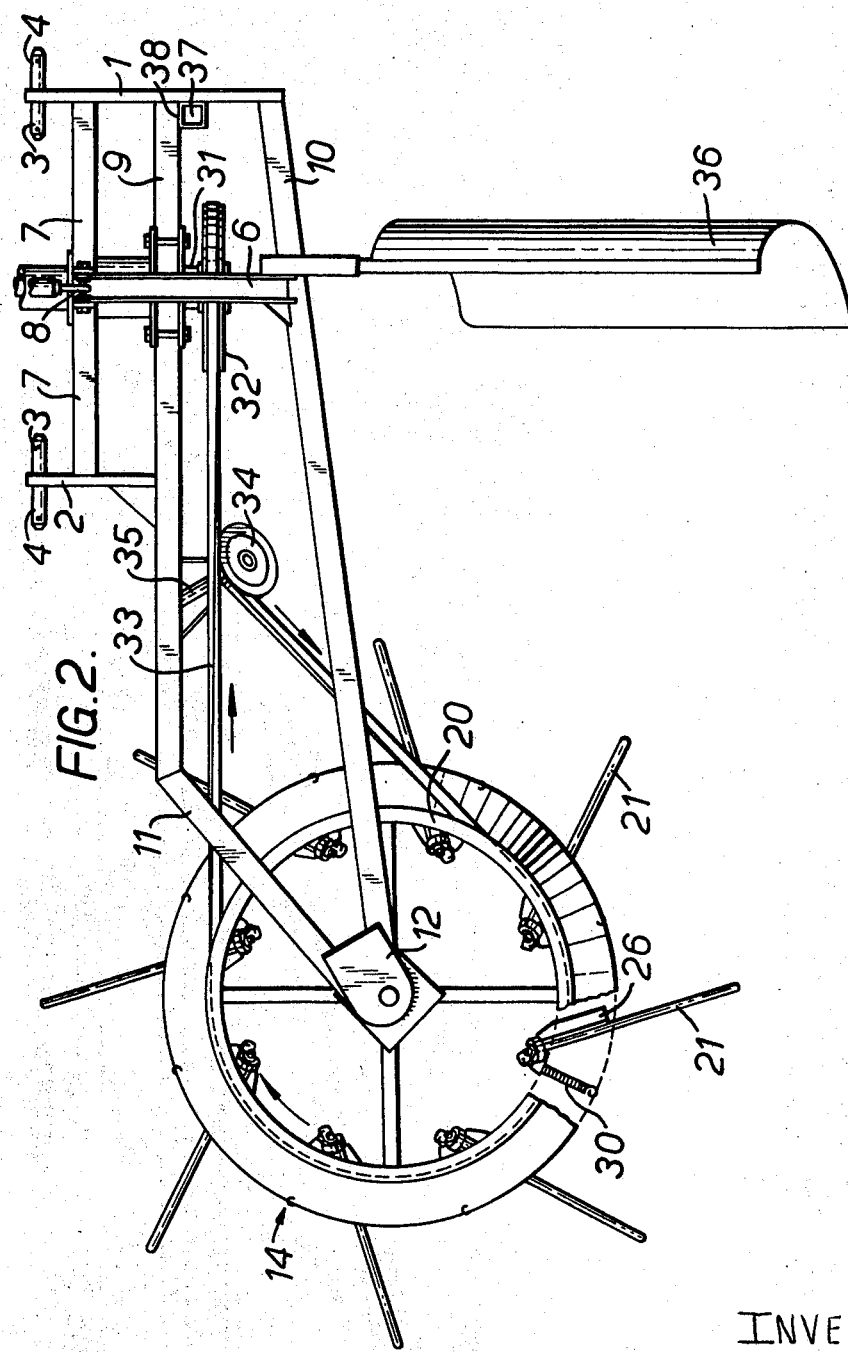

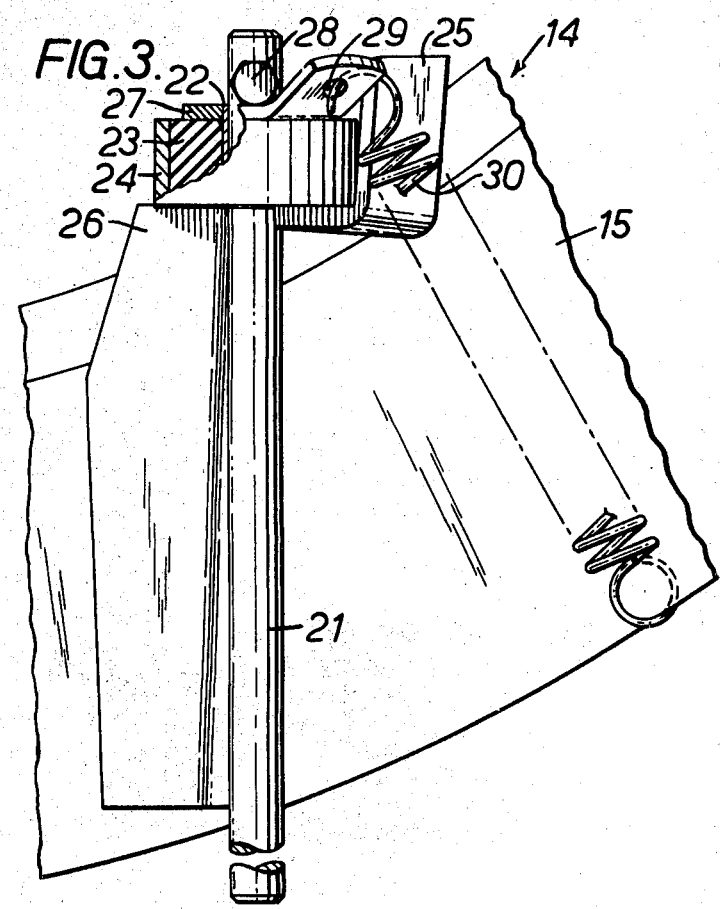
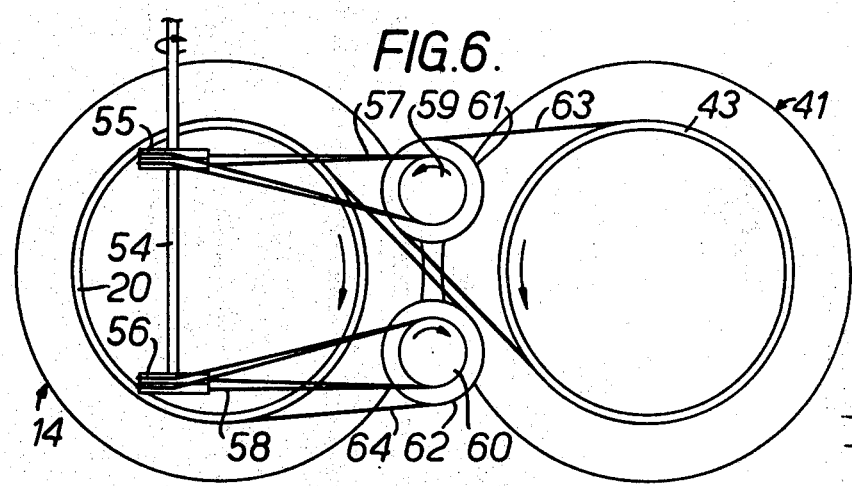

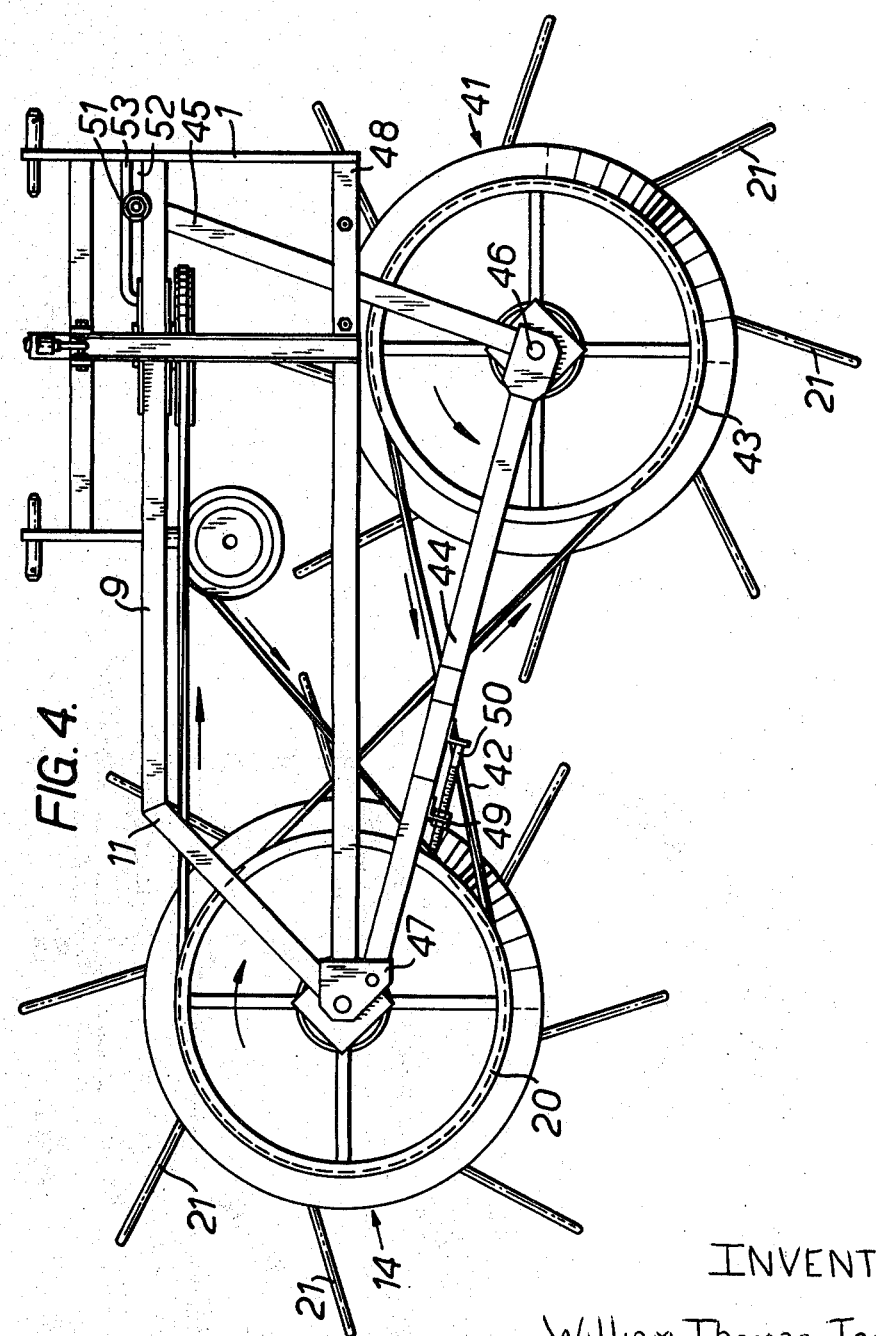

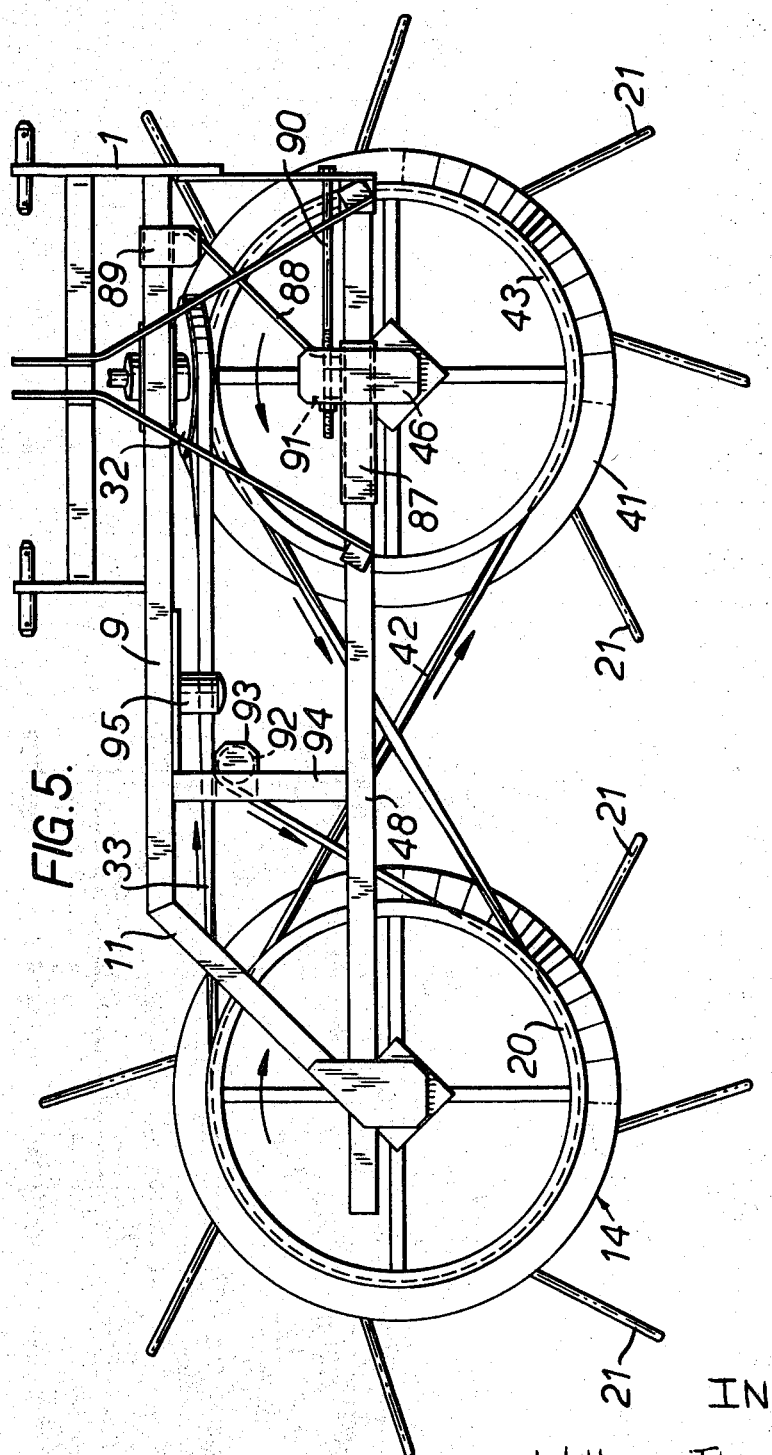

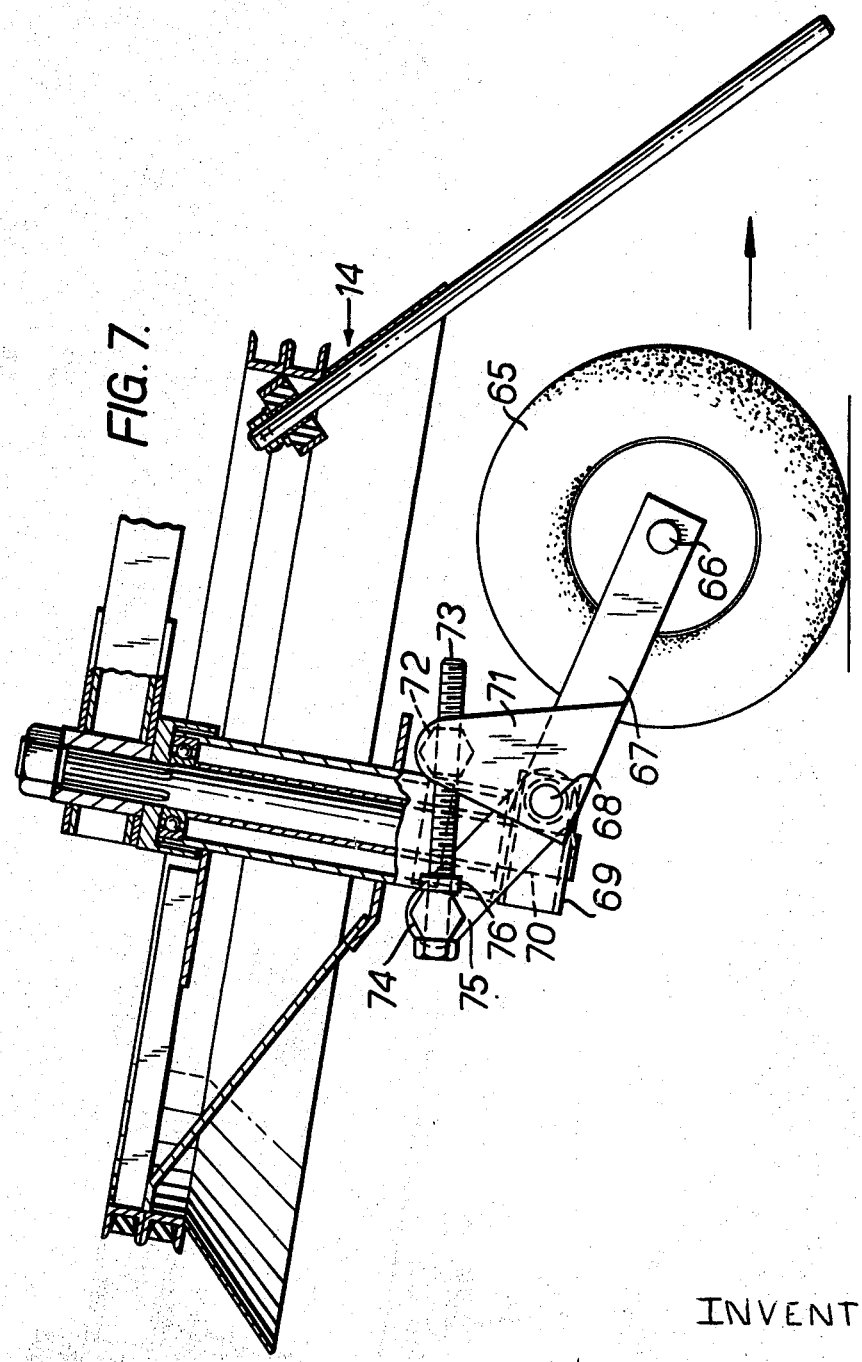

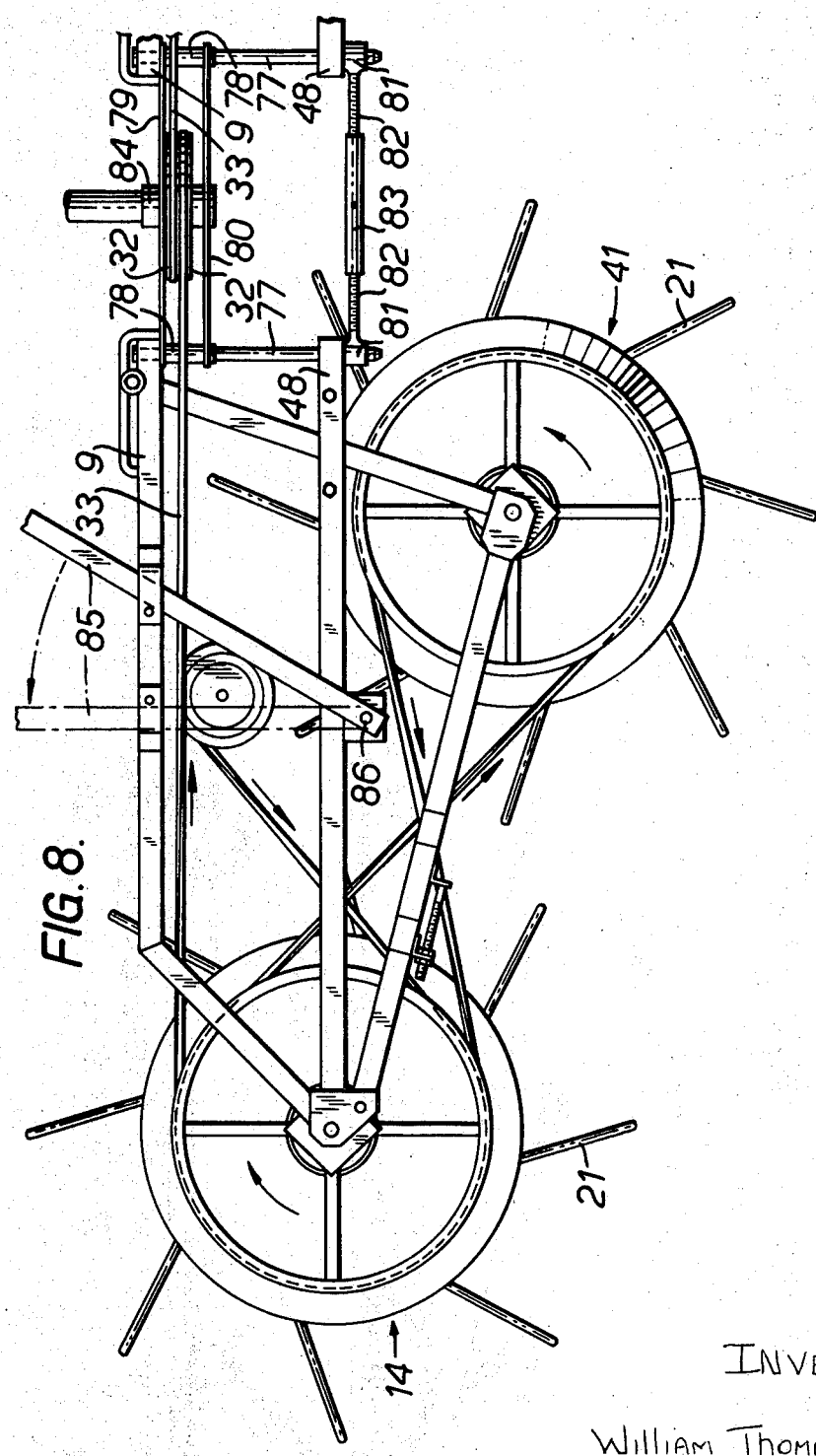

---

3,527,040
HAY-TEDDER INCLUDING ROTATABLE TEDDER REEL WITH FLEXIBLY MOUNTED TINES
William T. Teagle, Blackwater, Truro, England
Filed Sept. 20, 1967, Ser. No. 669,082
Int. Cl. A01d 79/00
U.S. Cl. 56—370                                16 Claims

ABSTRACT OF THE DISCLOSURE

The invention consists of a one-, two- or four-row hay-tedder adapted to be carried by the power lift mechanism of a farm tractor or provided with ground wheels and a draw-bar for towing behind the tractor. The single row machine has one tedding reel rotatable about a substantially vertical axis through a belt-drive from the tractor power take-off shaft and provided with a plurality of flexibly mounted downwardly extending rigid tines which act on the hay. The two-row machine is provided with a second tedding reel similar to and laterally spaced from the first reel and rotatable thereby through a second belt-drive, whilst the four-row machine is provided with two pairs of tedding reels each driven from the tractor power take-off shaft in the same manner as the reels of the two-row machine.

---

This invention relates to machines for tedding hay or cut grass and its object is to provide a machine capable of being detachably secured to and driven by a farm tractor.

According to the invention, such a machine comprises a frame adapted to be detachably secured to the back of a tractor, a tedding reel mounted in said frame for rotation about a substantially vertical axis and provided with a plurality of rigid, flexibly mounted tines, a longitudinally extending driving shaft mounted in said frame for operative connection to the power take-off shaft of the tractor and belt means operatively connecting said driving shaft to said reel.

The machine may be provided with a pair of tedding reels laterally spaced in said frame and driven in opposite directions by said belt means in order to project the hay or grass rearwardly through the space therebetween, or it may be further modified to provide two laterally spaced pairs of tedding reels, each pair separately driven from said driving shaft.

Various embodiments of the invention will be described with reference to the accompanying drawings in which:

FIG. 1 is a rear perspective view of a single-reel machine mounted upon the power lift arms of a tractor;

FIG. 2 is a plan view of the machine shown in FIG. 1, uncoupled from the tractor with a part of the tedding reel broken away and the belt guard and top cover member removed;

FIG. 3 is an enlarged underneath plan view, partly in section, of a part of the reel shown in FIGS. 1 and 2 and illustrating the resilient mounting for a tine;

FIG. 4 is a plan view of a two-reel machine adapted to be mounted upon the power-lift arms of a tractor;

FIG. 5 is a plan view of a modified form of the machine shown in FIG. 4;

FIG. 6 is a diagrammatic plan view of a modified driving arrangement for the machine shown in FIG. 4 or 5;

FIG. 7 is a part-sectional side elevation of the machine modified for the mounting of a ground engaging wheel when it is to be towed behind a tractor; and FIG. 8 is a plan view of part of a four-reel machine formed by detachably connecting two modified two-reel machines.

The machine shown in FIGS. 1 to 3 has a frame including members 1 and 2 each of which carries pins 3 and 4 for attachment to the side arms 5 of a tractor power-lift linkage and a member 6 connected to the frame members 1 and 2 by arms 7 and formed at its forward end with means 8 for detachably securing it to the central point of the linkage. The frame members 1 and 2 are connected together by a frame member 9 and the members 1 and 6 are connected together by a frame member 10 which is connected to the member 9 by a frame member 11. Secured to the junction of the frame members 10 and 11 is a plate 12 in which is journalled the upper end of the vertical shaft 13 of a tedding reel 14 having a dished ring 15 connected to the shaft by radial arms 16 from which depend struts 17 supporting a foot or pad 18 at the lower end of the shaft which is connected to the struts by spider arms 19. The ring 15 supports a pulley 20 and a plurality of rigid metal tines 21 each of which passes freely through a metal sleeve 22 (FIG. 3) which passes through a rubber bush 23 lining a collar 24 secured to the ring through the intermediary of an L-shaped member 25 and to a depending stop member 26 for the tine. Ring 15, collar 24, member 25 and stop member 26 are therefore rigidly interconnected. Each sleeve 22 is secured to a flange 27 engaged by a headed pin 28 passing through the tine 21 to prevent downward displacement of the tine through the sleeve 22, each flange 27 being apertured at 29 for the passage of the upper end of a tension spring 30 the lower end of which hooks onto the lower edge of the ring 15. Spring 30 thus exerts a downward pull on the tine 21. Thus each tine has a resilient end mounting in bush 23 which permits the tine to angularly yield in one direction, while stop 26 prevents opposite movement. This is illustrated in FIG. 2. The reel 14 is driven from the power take-off shaft (not shown) of the tractor through a shaft 31 journalled in the frame member 9 and carrying a pulley 32 operatively connected to the pulley 20 by a V belt 33 passing over an idler pulley 34 rotatably mounted on an inclined member 35 extending from the frame member 9. A metal swath plate 36 is adjustably secured to the frame member 10 and a leg 37 adjustably mounted in a tube 38 secured to frame members 1 and 9, is adapted to be lowered into engagement with the ground when the machine is detached from the supporting tractor, and retracted when the machine is operatively mounted on the tractor power-lift arms. The space between frame members 9 and 10 is preferably bridged, as shown in FIG. 1, by a cover plate 39 and the belt 33 is enclosed by a guard 40.

With the machine mounted on the tractor, the power-lift arms 5 are raised to lift the machine clear of the ground for transport to and from the field in which it is to operate and lowered into an operative position in which the tines will engage the hay or cut grass to be treated. By driving the belt 33 in the direction of the arrows in FIG. 2 the reel 14 will be rotated in a clockwise direction and the tines 21 will act on the hay or grass in a row offset from the path of movement of the tractor and the lateral spread of the tedded hay will be limited at the rear of the machine by the swath plate 36. The flexibly mounted tines 21, reverse movement of which is limited by the stops 26, will not flex or break, are easily detachable following release of the springs 30 should any straightening thereof be required and are prevented from digging into the ground by the foot or pad 18.

The machine illustrated in FIG. 4 is provided with a second tedding reel 41 identical with the reel 14 from which it is driven in an anti-clockwise direction, as looked at in FIG. 4, by a V belt 42 passing around a second sheave on the pulley 20 and a pulley 43 on the reel 41. The latter is supported by arms 44 and 45 of which the former is pivotally connected to a plate 47 secured to the junction of fixed frame members 11 and 48 supporting the reel 14 and is formed in telescoping parts which are relatively adjustable to vary the tension on the belt 42 and retained in their adjusted condition by lock nuts 49 on one part engaging a bolt 50 carried by the other part. The arm 45 is provided, at its end remote from the arm 44, with a pin 51 having a reduced portion (not shown) which passes through and is slidable in a slot 52, formed between the frame member 9 and a bracket 53 secured at its ends to the member 9 and frame member 1 respectively, to permit adjustment of arm 44 and reel 41.

In the modification shown in FIG. 5, the reel 41 is rotatable in a bracket 46 which is secured to a sleeve 87 slidable on the frame member 48 and is connected by an arm 88 to a bracket 89 slidable on the frame member 9. The sleeve 87 and bracket 89 are adjustable along the frame members 48 and 9 respectively to vary the tension on the belt 42 by a threaded bolt 90 axially fixed in the machine frame and rotatable in a nut 91 on the bracket 46. The belt 33 driving the reel 14 passes from the pulley 32 around a lower idler pulley 92, rotatably mounted in a bracket 93 on a frame member 94, and returns to the pulley 32 around the lower part of an upper idler pulley 95 secured to the frame member 9. Since the reels in FIGS. 4 and 5 rotate in opposite directions, the hay or cut grass is projected by the tines 21 rearwardly between the reels and spreads out across the full width of the machine. When it is required to leave the hay or grass in a swath suitable for baling, a pair of swath plates of the kind shown at 36 in FIGS. 1 and 2, may be adjustably secured to the rear end of the machine frame to form a passage for receiving and limiting the spread of the hay or grass emerging from between the tedding reels.

FIG. 6 shows, in diagrammatic form, a modified drive for the reels 14 and 41, whereby each reel is independently driven from a common shaft 54 adapted to be operatively connected to the power take-off shaft of the tractor. The shaft 54 carries pulleys 55 and 56 connected by V belts 57 and 58 to pulleys 59 and 60 respectively carried by vertical lay shafts rotatably mounted in the machine frame. The lay shafts also carry pulleys 61 and 62 which are connected to the pulleys 43 and 20 by V belts 63 and 64 respectively to drive the reels 41 and 14 in opposite directions as shown by the arrows in FIG. 6, so that the hay or cut grass is once again projected rearwardly between the reels.

Instead of being mounted upon the power lift arms of a tractor the machine may be towed on a pair of ground wheels, one of which is shown at 65 in FIG. 7. Each wheel 65 is mounted upon a shaft 66 which extends beyond one side of the wheel and is rotatable in a tubular member 67 pivotally mounted on a shaft 68 passing through a block 69 secured to the lower end of a shaft 70 passing freely through the hub of one of the reels, in this case the reel 14. Secured to each side of the tubular member 67 are plates 71 bridged by a hexagonal bar 72 through which passes a bolt 73 which also passes through a second hexagonal bar 74 which connects a pair of arms 75 pivotally mounted on the shaft 68, on each side of the wheel 65. Rotation of the bolt 73 will effect pivotal movement of the plates 71 and arms 75 about the shaft 68 to adjust the machine frame vertically relative to the wheels 65, after which the mechanism can be locked in its adjusted position by a nut 76 on the bolt 73.

Two machines of the kind shown in FIG. 4 may be suitably modified to form two detachable halves, one of which is shown in FIG. 8, of a four-reel machine fitted with ground wheels and adapted to be towed behind a tractor. The frame members 9 and 48 of each half are apertured for the passage of rods 77 upon which are mounted sleeves 78 connected together by plates 79 and 80, and eye portions 81 of externally threaded rods 82 adjustably secured together by an internally threaded sleeve 83. Rotatably mounted in the plates 79 and 80 is a shaft 84 adapted for connection to a tractor power take-off shaft and carrying pulleys 32 around which pass belts 33 forming parts of identical driving systems for the reels 14 and 41 in opposite halves of the machine. Each half of the machine is provided with a groundwheel (not shown) mounted beneath the reel 14 in the manner shown in FIG. 7 and also a drawbar 85 for connection to the tractor. Each drawbar is pivotally mounted at 86 in its half of the machine frame for movement between the full-line position shown in FIG. 8, when the two halves of the machine are connected together in operative position and the broken-line position shown in FIG. 8, when the two halves of the machine are separated and re-connected one behind the other for transport purposes.

I claim:

1. A machine for tedding hay or cut grass comprising a frame adapted to be detachably secured to the back of a tractor, a tedding reel mounted on said frame for rotation about a substantially vertical axis and comprising a dished ring, a pulley mounted on said ring, a plurality of rigid tines extending downwardly through said ring, resilient mounting means embracing said tines mounted at spaced intervals along the inner side of said ring and around the upper edge of said ring, a driving shaft extending longitudinally of the direction of movement of the machine and mounted on said frame, means on said shaft adapted for connection to the power take-off shaft of the tractor, a pulley mounted on said driving shaft and belt means passing around said pulleys for driving said reel from said shaft.

2. A machine according to claim 1, wherein said belt means comprises a single V belt passing around said pulleys on said ring and said driving shaft and over an intermediate idler pulley which is rotatable in the machine frame about an axis inclined to the rotational axes of said reel and driving shaft.

3. A machine according to claim 1, wherein said belt means comprises a single V belt passing around said pulley on said driving shaft, over a first intermediate idler pulley rotatable about a vertical axis on a machine frame member, around said pulley on said ring and under a second intermediate idler pulley rotatable about a horizontal axis on another machine frame member.

4. A machine according to claim 1, wherein a second tedding reel identical with said first mentioned reel is mounted in said frame for rotation about a substantially vertical axis in spaced transverse relation to said first-mentioned reel and is driven by the latter in the opposite direction thereto through second belt means passing around a second sheave on the pulley on said first ring and the pulley on said second ring whereby the hay or grass on which the tines act is projected rearwardly through the space between said reel.

5. A machine according to claim 1, wherein said belt means comprises a first V belt passing around the driving shaft and a first pulley on a lay shaft mounted on said machine frame for rotation about a vertical axis, and a second V belt passing around a second pulley on said lay shaft and the pulley on said ring.

6. A machine according to claim 5, wherein a second tedding reel identical with said first-mentioned reel is mounted in said frame for rotation about a substantially vertical axis in spaced transverse relation to said first-mentioned reel and is driven in the opposite direction to said first reel by a V belt passing around a second pulley on said driving shaft and a second pulley on a second lay shaft mounted on said machine frame for rotation about a vertical axis, and a fourth V belt passing around a second pulley on said second lay shaft and the pulley on said second ring.

7. A machine according to claim 1, wherein means are provided for detachably securing said machine frame to the power lift linkage of the tractor.

8. A machine according to claim 1 wherein said machine frame includes ground wheels and a draw bar for connection to a towing hitch on the tractor.

9. A machine according to claim 8, wherein said ground wheels are vertically adjustable with respect to the machine frame.

10. A machine according to claim 8, longitudinally divided into identical separable halves each having a pair of tedding reels, a ground wheel and a draw bar, the tedding reels on one half being driven by a first pulley on the drive shaft in opposite directions and the tedding reels on the other half being driven by a second pulley on the drive shaft in opposite directions, each draw bar being pivotally mounted in its half of the frame for movement about a vertical axis between a position inclined to the longitudinal axis of the machine for connection to the towing tractor when the machine halves are laterally connected, and a position parallel to said axis for connecting one half of the divided frame to said tractor and the other half of said frame to the rear end of said one half.

11. A machine according to claim 1, wherein said dished ring is connected by radial arms to a central substantially vertical shaft, the upper end of which is rotatably mounted in the machine frame and the lower end of which terminates in a circular pad or foot connected to said radial arms by upwardly extending struts.

12. A machine according to claim 1, wherein the spread of hay or grass is limited by at least one swath plate adjustably secured to the machine frame.

13. A machine as defined in claim 1, wherein said mounting means for each tine comprises a collar rigidly secured to said ring and a body of resilient material within said collar, the tine passing down through said body of resilient material.

14. A machine as defined in claim 1, wherein a tension spring is connected between the upper end of each tine and the lower edge of said ring.

15. A machine as defined in claim 1, wherein stops are mounted on said ring for limiting movement of said tines in one direction while not interfering with movement of the tines in the other direction.

16. A machine as defined in claim 1 wherein the resilient mounting for each tine is a body of resilient material on the ring through which the tine passes downward, a tension spring connected between the lower edge of said ring and the upper end of said tine for biasing the tine to swing in one direction about the resilient mounting, and a stop on said ring limiting swing of the tine in said direction and solidly backing said tine during rotation of said reel.

References Cited

UNITED STATES PATENTS

| 2,390,375 | 12/1945 | Kucera | 56—370 |
| 2,502,599 | 4/1950 | Smart | 56—370 |

FOREIGN PATENTS

| 251,953 | 1/1967 | Germany. |
| 1,018,252 | 1/1966 | Great Britain. |
| 1,373,390 | 8/1964 | France. |
| 6612623 | 11/1966 | Netherlands. |

RUSSELL R. KINSEY, Primary Examiner

J. N. ESKOVITZ, Assistant Examiner